United States Patent
Daage et al.

(10) Patent No.: US 8,182,672 B2
(45) Date of Patent: May 22, 2012

(54) PROCESS FOR PREPARING LUBE BASESTOCKS HAVING SUPERIOR LOW TEMPERATURE PROPERTIES AT HIGH VI

(75) Inventors: Michel Daage, Hellertown, PA (US); David W. Larkin, Ponca City, OK (US); William J. Murphy, Baton Rouge, LA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 780 days.

(21) Appl. No.: 12/316,746

(22) Filed: Dec. 16, 2008

(65) Prior Publication Data

US 2009/0166252 A1 Jul. 2, 2009

Related U.S. Application Data

(60) Provisional application No. 61/009,397, filed on Dec. 28, 2007.

(51) Int. Cl.
*C10G 35/06* (2006.01)
*C10G 35/085* (2006.01)

(52) U.S. Cl. ............... 208/64; 208/65; 208/89
(58) Field of Classification Search ............ 208/62–65, 208/88, 89, 95, 97
See application file for complete search history.

(56) References Cited

U.S. PATENT DOCUMENTS

| 6,620,312 B1 * | 9/2003 | Murphy et al. ................. 208/58 |
| 6,833,064 B2 | 12/2004 | Berlowitz et al. |
| 2003/0102254 A1 | 6/2003 | Eijsbouts et al. |
| 2004/0065584 A1 * | 4/2004 | Bishop et al. .................... 208/27 |
| 2004/0112792 A1 * | 6/2004 | Murphy et al. ................. 208/89 |
| 2004/0256287 A1 | 12/2004 | Miller et al. |
| 2006/0086644 A1 * | 4/2006 | Murphy et al. .......... 208/111.01 |

* cited by examiner

*Primary Examiner* — Walter D Griffin
*Assistant Examiner* — Renee E Robinson
(74) *Attorney, Agent, or Firm* — Robert A. Migliorini

(57) ABSTRACT

A process for preparing basestocks having superior low temperature properties at high viscosity index (VI). More particularly, a waxy feedstock is contacted with a first dewaxing catalyst having a refined constraint index (CI*) 2.0 or less followed by contacting with a second dewaxing catalyst having a refined constraint index greater than 2.0.

20 Claims, No Drawings

PROCESS FOR PREPARING LUBE BASESTOCKS HAVING SUPERIOR LOW TEMPERATURE PROPERTIES AT HIGH VI

This application claims the benefit of U.S. Provisional Application 61/009,397 filed Dec. 28, 2007.

FIELD OF THE INVENTION

This invention relates to a process for preparing basestocks having superior low temperature properties at high viscosity index (VI). More particularly, a waxy feedstock is contacted with a first dewaxing catalyst having a refined constraint index (CI*) 2.0 or less followed by contacting with a second dewaxing catalyst having a refined constraint index of greater than 2.0.

BACKGROUND OF THE INVENTION

Waxy feedstocks may be used to prepare basestocks having a high VI. However, in order to obtain a basestock having low temperature properties suitable for the intended use, it is usually necessary to dewax the waxy feedstock. Dewaxing may be accomplished by solvent means or catalytic means. Solvent dewaxing is a physical process whereby waxes are removed by contacting with a solvent such as methylethylketone followed by chilling to crystallize the wax and filtration to remove the wax. Catalytic dewaxing involves converting the hydrocarbons leading to unfavorable low temperature properties to hydrocarbons having more favorable low temperature properties. Long chain normal paraffins and slightly branched paraffins readily solidify and thus result in generally unfavorable low temperature properties. Catalytic dewaxing is the process of converting these long chain normal paraffins and slightly branched paraffins to molecules having improved low temperature properties.

Catalytic dewaxing may be accomplished using catalysts that primarily dewax by cracking waxes to lower boiling products, or by catalysts that primarily isomerize waxes to more highly branched products. Catalysts that dewax by cracking decrease the yield of lubricating oils while increasing the yield of lower boiling distillates. Catalysts that isomerize do not normally result in significant boiling point conversion.

Catalytic dewaxing may be accomplished selectively using zeolites that primarily function as cracking zeolites and having a pore size and shape that admits n-paraffins and slightly branched paraffins but excludes more highly branched molecules, cycloaliphatics, and aromatics. Such zeolites are exemplified by ZSM-5, ZSM-11, ZSM-12, and offretite.

Catalytic dewaxing may also be accomplished by use of zeolites that perform selective branching on n-paraffins. These hydroisomerizing zeolites convert n-paraffins to isoparaffins that have more favorable low temperature properties. Examples of such isomerizing zeolites include ZSM-22, ZSM-23, SSZ-32, ZSM-35, and ZSM-48. The amount of isomerization vs. cracking is typically controlled by process conditions.

There is still a need for improved dewaxing processes that achieve good yields of high VI lube base oils having good low temperature properties.

SUMMARY OF THE INVENTION

In an embodiment, the invention provides a two stage process for dewaxing a waxy lube feedstock. The invention includes contacting the feedstock in a first stage with at least one 1D, 10-ring molecular sieve containing catalyst having a refined constraint index of 2.0 or less under first hydroisomerizing dewaxing conditions to produce a first dewaxed product stream. The first dewaxed product stream is then contacted in a second stage with at least one 1D, 10-ring molecular sieve containing catalyst having a refined constraint index of greater than 2.0 under second hydroisomerizing dewaxing conditions to produce a dewaxed product.

In another embodiment, the invention provides a process for dewaxing a waxy lube feedstock containing greater than about 3 wt. % sulfur. The process includes contacting the feedstock with a hydrotreating catalyst capable of converting a substantial amount of the sulfur in the feedstock to $H_2S$ and nitrogen to NH3, under hydrotreating conditions, thereby resulting in a hydrotreated feedstock containing less than about 3 wt. % sulfur and less than about 0.2 wt. % nitrogen, based on the total weight of the feedstock. The hydrotreated feedstock is then separated from hydrogen sulfide, ammonia and any light hydrocarbons. The separated hydrotreated feedstock is then contacted with at least one 1D, 10-ring zeolite containing catalyst having a refined constraint index of 2.0 or less under first hydroisomerizing dewaxing conditions to produce a first dewaxed product stream. The first dewaxed product stream is then contacted with at least one 1D, 10-ring molecular sieve containing catalyst having a refined constraint index of greater than 2.0 under second hydroisomerizing dewaxing conditions to produce a dewaxed product.

DETAILED DESCRIPTION OF THE PREFERRED EMBODIMENTS

Overview

One manner of identifying desirable lubricant molecules is by boiling point. For Group II or III basestocks, a typical molecule of the desired boiling point will have roughly 30 carbons. An idealized model for a desirable lubricant molecule would be a primarily straight chain hydrocarbon with about 30 carbons and having roughly 3 methyl side chains.

In addition to the overall molecule size, the number of branches in the molecule is also important for lubricant properties. In order to have a desirable viscosity index (VI), it is desirable to minimize the number of overall branches in the primarily straight chain lubricant molecule. However, in order to improve pour point and other flow properties, it is desirable to insert branches in long chain portions of molecule, such as long unbranched end chains. Proper balancing of these properties will lead to a lubricant with a desirable combination of properties.

This invention provides a way of increasing the number of desirable lubricant molecules produced from a feedstock. The invention employs a two step hydroisomerization process. The first hydroisomerization step is capable of inserting methyl branches across most or all of the full length of a primarily straight chain molecule. This step will produce a distribution of branched molecules, with some having more branches than desired, others having the desired branching structure, and some having fewer branches than desired. Due to the nature of the hydroisomerization process, the likelihood of having two branches very close together is low. Thus, longer segments are more likely to be hydroisomerized than short segments.

After the first hydroisomerization step, molecules with the desired number of branches will have roughly 3 branch points, meaning that there will be 4 straight chain segments. The length of each segment will vary in each molecule. The likelihood of a "long" segment being at the end of a molecule is roughly 2 in 4 (the number of end segments versus the number of middle segments in the molecule). For a molecule with only two branch points, the odds of having a long segment at the end of a molecule increases to 2 in 3. Conversely, the odds of having a long segment at the end of a molecule with more than 3 branch points decreases with each additional branch.

In the second hydroisomerization step, the invention takes advantage of the fact that the likelihood of having a "long" end segment in a molecule is much higher for molecules with fewer branches. The second hydroisomerization step employs a catalyst that selectively introduces branches only for straight chain end segments. Based on the simple model described above, this type of hydroisomerization step will have a reduced likelihood of adding further branches in molecules that are already heavily branched, and a corresponding increased likelihood of adding branches to molecules that have 3 or fewer branches. As a result, this second hydroisomerization step should selectively isomerize molecules with few branches, leading to improved pour point, while minimizing additional branching that would primarily lead to a reduction in VI.

The benefits of the invention are relative based on the starting feedstock used. Given a particular starting feed, the invention will provide a lubricant product with a higher percentage terminal methyl groups. When processed to achieve a target VI and/or yield, the invention will provide a lubricant with an improved pour point and cloud point relative to conventional processing.

Feedstock

Feedstocks used in the process of the present invention are wax-containing feeds that boil in the lubricating oil range. Such feedstocks typically have a 10% distillation point greater than about 650° F. (343° C.), measured by ASTM D 86 or ASTM 2887, and are derived from both mineral and synthetic sources. The wax content of the feedstock is at least about 1 wt. %, based on feedstock but can range up to about 95 wt. % oil in wax content. The wax content of a feed may be determined by nuclear magnetic resonance spectroscopy (ASTM D5292), by correlative ndM methods (ASTM D3238) or by solvent methods (ASTM D3235). The waxy feeds may be derived from a number of sources, such as oils derived from solvent refining processes such as raffinates, partially solvent dewaxed oils, deasphalted oils, distillates, vacuum gas oils, coker gas oils, hydrocracker bottoms, slack waxes, foots oils and the like, Fischer-Tropsch waxes, and mixtures thereof. Preferred feeds are hydrocracker bottoms, slack waxes and Fischer-Tropsch waxes. Hydrocracker bottoms are typically a 700° F.+ product of hydrocracking of an atmospheric or vacuum gas oil feed. This type of product often is referred to as an unconverted fraction. Slack waxes are typically derived from hydrocarbon feeds by solvent or propane dewaxing. Since slack waxes typically contain some residual oil they are usually deoiled. Foots oils are derived from deoiled slack waxes. Fischer-Tropsch waxes are typically synthetic waxes prepared by the Fischer-Tropsch synthetic process.

In an embodiment, the feedstocks may have relatively high amounts of nitrogen- and sulfur-contaminants. Feedstocks containing up to about 0.2 wt. % of nitrogen, based on feed and up to about 3.0 wt. % of sulfur can be processed in accordance with the present invention. Feeds having high wax content typically have high viscosity indexes of up to about 200 or more. Sulfur and nitrogen contents may be measured by standard ASTM methods D5453 and D4629, respectively.

In another embodiment, the feed can contain at least 500 wppm sulfur, or at least 0.1 wt % sulfur. In such an embodiment, treatment of the feedstock according to the invention will result in a product with a lower sulfur content than the feedstock.

For feeds derived from solvent extraction, the high boiling petroleum fractions from atmospheric distillation are sent to a vacuum distillation unit, and the distillation fractions from this unit are solvent extracted. The residue from vacuum distillation may be deasphalted. The solvent extraction process selectively dissolves the aromatic components in an extract phase while leaving the more paraffinic components in a raffinate phase. Naphthenes are distributed between the extract and raffinate phases. Typical solvents for solvent extraction include phenol, furfural and N-methyl pyrrolidone. One can control the degree of separation between the extract and raffinate phases by controlling the solvent to oil ratio, extraction temperature and method of contacting distillate to be extracted with solvent.

Hydrotreating

Waxy feedstocks typically contain sulfur and/or nitrogen contaminants in an amount unacceptable for lube oils. Accordingly, if the waxy feedstock contains unacceptable amounts of sulfur and/or nitrogen contaminants, such feedstock is contacted with a hydrotreating catalyst under conditions suitable to remove at least an effective amount of the sulfur and/or nitrogen contaminants to produce a hydrotreated feedstock. By "effective amount' we mean at least that amount of nitrogen and sulfur are removed to an acceptable level for lube oils. Hydrotreating catalysts suitable for use herein are those containing at least one Group VI metal and at least one Group VIII metal, including mixtures thereof. Preferred metals include Ni, W, Mo, Co and mixtures thereof. These metals or mixtures of metals are typically present as oxides or sulfides on refractory metal oxide supports. The mixture of metals may also be present as bulk metal catalysts wherein the amount of metal is 30 wt. % or greater, based on catalyst.

Non-limiting examples of suitable metal oxide supports include silica, alumina, silica-alumina, titania or mixtures thereof. Preferred is alumina. Preferred aluminas are porous aluminas such as gamma or eta alumina. The acidity of metal oxide supports can be controlled by adding promoters and/or dopants, or by controlling the nature of the metal oxide support, e.g., by controlling the amount of silica incorporated into a silica-alumina support. Non-limiting examples of promoters and/or dopants suitable for use herein include halogen (especially fluorine), phosphorus, boron, yttria, rare-earth oxides and magnesia. Promoters such as halogens generally increase the acidity of metal oxide supports while mildly basic dopants such as yttria or magnesia tend to decrease the acidity of such supports.

It should be noted that bulk catalysts do not include a support material, and the metals are not present as an oxide or sulfide but as the metal itself. These catalysts typically include metals within the range described above in relation to the bulk catalyst as well as at least one extrusion agent. The amount of metals for supported hydrotreating catalysts, either individually or in mixtures, ranges from about 0.5 to about 35 wt. %, based on catalyst. In the case of preferred mixtures of Group VI and Group VIII metals, the Group VIII metals are present in amounts of from about 0.5 to about 5 wt. %, based on catalyst and the Group VI metals are present in amounts of from about 5 to about 30 wt. %. The amounts of metals may be measured by atomic absorption spectroscopy, inductively coupled plasma-atomic emission spectrometry or other methods specified by ASTM for individual metals. Non-limiting examples of suitable commercially available hydrotreating catalysts include RT-721, KF-840, KF-848, and Sentinel™.

Preferred catalysts are low acidity, high metals content catalysts including KF-848 and RT-721.

Hydrotreating conditions involve temperatures in the range 280° C. to 400° C., preferably 300° C. to 380° C. at pressures in the range of 1480 to 20786 kPa (200 to 3000 psig), preferably 2859 to 13891 kPa (400 to 2000 psig), a space velocity of from 0.1 to 10 LHSV, preferably 0.1 to 5 LHSV, and a hydrogen treat gas rate of from 89 to 1780 $m^3/m^3$ (500 to 10000 scf/B), preferably 178 to 890 $m^3/m^3$ (1000 to 5000 scf/B).

Hydrotreating will reduce the amount of nitrogen and sulfur contaminants in the waxy feedstock by converting these contaminants to ammonia and hydrogen sulfide, respectively. These gaseous contaminants may be separated from the hydrotreated feedstock using conventional techniques such as strippers, knock-out drums and the like. In the alternative, if the hydrotreated effluent from the hydrotreater contains amounts of contaminants that will not interfere with the subsequent dewaxing stages, the entire gaseous and liquid effluent from the hydrotreater may be sent to the first dewaxing stage.

The hydrotreating reaction stage can be comprised of one or more fixed bed reactors or reaction zones within a single reactor each of which can comprise one or more catalyst beds of the same, or different, hydrotreating catalyst. Although other types of catalyst beds can be used, fixed beds are preferred. Such other types of catalyst beds suitable for use herein include fluidized beds, ebullating beds, slurry beds, and moving beds. Interstage cooling or heating between reactors or reaction zones, or between catalyst beds in the same reactor or reaction zone, can be employed since the desulfurization reaction is generally exothermic. A portion of the heat generated during hydrotreating can be recovered. Where this heat recovery option is not available, conventional cooling may be performed through cooling utilities such as cooling water or air, or through use of a hydrogen quench stream. In this manner, optimum reaction temperatures can be more easily maintained.

During hydrotreating, less than about 10 wt. % of the feedstock, preferably less than about 5 wt. %, more preferably less than about 3 wt. %, is converted to 650° F. (343° C.) minus products to produce a hydrotreated feedstock.

Dewaxing

The dewaxing catalysts of the process of the present invention are unidimensional (1D) 10 ring molecular sieves containing catalysts having defined refined constraint indices. The refined constraint index (CI*) is discussed in a review in ZEOLITES, vol. 4, April, pages 98-105 (1984) and is described by P. A. Jacobs and J. A. Martens, Pure & Applied Chem., 1986, 58, 1329 both of which are incorporated herein in their entirety.

Briefly, the CI* is based on the isomerization of n-decane at 5% conversion. The CI* is defined as the ratio of 2-methylnonane to 5-methylnonane and constitutes an alternative method of discriminating between different families of porous crystalline materials. Some catalysts will preferentially isomerize a molecule at the end of the molecular chain. These types of catalysts will preferentially produce 2-methylnonane. Other catalysts will have a lower selectivity preference for the end of the chain, and will instead randomly isomerizes over the full length of a molecular chain. Since selectivity of the bifunctional methyl branching of n-decane is postulated to be transition state controlled, the CI* will not reflect differences in diffusional effects on the ingoing feed molecules, but rather, differences in size and geometry of the transition state or differences in the diffusion of the mono-branched olefins from the acid site to a metal cluster.

There are two dewaxing stages in the present process. The first stage has a dewaxing catalyst having a CI* of less than about 2.5, preferably 2.0 or less, while the second stage has a dewaxing catalyst having a CI* of greater than 2.0, preferably at least about 2.5. The upper limit of CI* of the second stage will be about 10.

While not wishing to be bound by any particular theory, it is believed that the first stage dewaxing catalyst promotes formation of isomerate branches somewhat randomly across a paraffin chain, while the second stage dewaxing catalyst promotes isomerate branching at the ends of the paraffin chain. Thus, the combination of first and second stage dewaxing catalysts gives improved isomerate branching distribution over the first stage catalyst alone. This improved branching distribution results in lube oils having improved low temperature properties.

The first stage dewaxing catalyst is a zeolite containing catalyst, which zeolite has a CI* less than about 2.5, preferably 2.0 or less. The zeolite itself is also a 10 member ring and unidimensional zeolite. Non-limiting examples of preferred zeolites for use in the first dewaxing stage of the present invention include ZSM-48 and zeolites isostructural therewith including EU-2, EU-11, and ZBM-30. Examples of bound ZSM-48 catalysts with a CI* of less than about 2.0 are provided below.

The second stage dewaxing catalyst is a molecular sieve containing catalyst, wherein the molecular sieve has a CI* of greater than 2.0, preferably at least about 2.5. The molecular sieve is also 10 ring and unidimensional molecular sieve. Preferred molecular sieves include ZSM-22, ZSM-23, ZSM-35, ZSM-48, SAPO-11 and their corresponding isostructural molecular sieves, including SSZ-32, Theta-1, NU-10, EU-13, KZ-1, ferrierite and NU-23. Preferably, the first stage dewaxing catalyst contains a different zeolite than the second stage dewaxing catalyst. For example, the first stage catalyst can contain a zeolite that is ZSM-48 or isostructural with ZSM-48, while the second catalyst can be ZSM-23, or another isostructural zeolite.

The preparation of the first and second stage catalysts is described as follows. The zeolite and molecular sieves used to prepare the catalysts to be used in the first and second stages are composited with binders. Non-limiting examples of binders suitable for use herein include alumina, titania, zirconia, silica oxides including silica, silica-alumina, silica-magnesia, silica-zirconia, silica-thoria, silica-beryllia, silica-titania, and clays including clays from the montmorillonite and kaolin families. Mixtures of such binders may also be used. The clays may be treated by calcination, acid treatment or chemical modification. The zeolite and binder may be mulled together and extruded using conventional extruding techniques. The ratio of zeolite to binder can range from about 95:5 to about 30:70. The extrudate may be subjected to conventional dealumination procedures. If a high silica material is desired the zeolite or molecular sieve can be dealuminated. Dealumination can be attained by methods known in the art, such as for example acid leaching or by a steam treatment. Steam treatment is effected by contacting the catalyst extrudates with steam at elevated temperatures ranging from about 250° C. to about 650° C., and preferably from about 400° C. to about 550° C. This treatment can be accomplished in an atmosphere of substantially 100% steam or in an atmosphere comprised of steam or ammonia and at least one other gas that is essentially inert with respect to the zeolites. A similar treatment can be accomplished at lower temperatures and elevated pressure, e.g., from about 180° C. to about 370° C. at from about 10 to about 200 atmospheres. Other methods of dealumination involve chemical treatment with chemical agents such as fluorosilicate salt, carboxylic acid, and adding complexing agent to the molecular sieve crystallization mixture.

The molecular sieve/zeolite catalysts may also be calcined before or after extrusion, preferably after extrusion. Calcination can be performed by any suitable calcination technique such as the use of an oxygen-containing environment at temperatures from about 100° C. to about 500° C., preferably from about 250° C. to about 450° C. for an effective amount of time. That is for a time of about 0.5 hours to about 24 hours. The catalyst can also be reduced in the presence of a flowing hydrogen-containing gas at a temperature from about 200° C. to about 500° C.

At least one hydrogenation metal is preferably incorporated, i.e. by deposition, onto the hydroisomerizing dewaxing catalysts in either stage before or after, preferably after, the binder has been incorporated with the zeolite/molecular sieve. The hydrogenation metal can be deposited by any known means. Non-limiting examples of suitable means to incorporate the hydrogenation metal include incipient wetness, ion exchange, mechanical mixing of metal oxide precursor(s) with molecular sieve and binder, or a combination thereof, with the incipient wetness technique being the preferred method. The first and second stage hydroisomerization catalysts will preferably both contain a metal hydrogenation component. The metal hydrogenation component is preferably a Group VIII metal, more preferably a noble metal, most preferably Pd, Pt or a mixture thereof. The amount of metal component is in the range of about 0.1 to 5 wt. %, based on catalyst, preferably about 0.1 to 2 wt. %. The dewaxing catalyst in the first stage may be used in the sulfided or unsulfided form, and is preferably in the sulfided form. Also, the ratio of hydroisomerizing dewaxing catalysts in the first stage to the second stages ranges from 1:10 to 10:1, preferably 1:3 to 3:1, most preferably 1:1 to 3:1.

In order to determine the refined constraint index or CI* of the catalyst, the CI* of the bound catalyst is first measured to determine the initial catalyst CI*. If the CI* is not in the desired range, the CI* can be adjusted by modifying one or more parameters including the silica-alumina ratio, the degree of dealumination, the degree of calcining, steam treatment, the nature of binder, and the zeolite/molecular sieve: binder ratio. By monitoring the effect of modifying any given parameter on the CI*, the CI* can be adjusted to the desired value.

The hydrotreated feedstock is then contacted in a first stage hydroisomerization with a hydroisomerization catalyst under hydroisomerization conditions to produce a first hydroisomerized product. It will be understood that the terms hydroisomerization and dewaxing are used interchangeably herein. The first stage hydroisomerized product is then conducted to a second stage hydroisomerization in the presence of a second hydroisomerizing dewaxing catalyst to produce a second hydroisomerized product. Effective hydrodewaxing conditions as used herein includes temperatures of from 250° C. to 400° C., preferably 275° C. to 350° C., pressures of from 791 to 20786 kPa (100 to 3000 psig), preferably 1480 to 17338 kPa (200 to 2500 psig), liquid hourly space velocities of from 0.1 to 10 hr$^{-1}$, preferably 0.1 to 5 hr$^{-1}$ and hydrogen treat gas rates from 45 to 1780 m$^3$/m$^3$ (250 to 10000 scf/B), preferably 89 to 890 m$^3$/m$^3$ (500 to 5000 scf/B).

Process

In a preferred embodiment, hydrotreating is performed in a separate reactor and both the first stage and the second stage of hydroisomerizing dewaxing is performed in separate catalyst beds in a second single reactor. It is preferred that the hydrotreating catalyst contact the waxy feedstock first, i.e., is placed upstream of first stage dewaxing. It is also preferred that light gases and H$_2$S/NH$_3$ be stripped between any one or more reactors or reaction zones or catalyst beds. It is more preferred that light gases and H$_2$S and NH3 be stripped between the hydrotreating stage and the first dewaxing stage. This preferred embodiment helps improve the performance of the first and second stage dewaxing catalysts. However, if the amount of H$_2$S/NH$_3$ formed by hydrotreating is not excessive so as to unacceptably interfere with the performance of subsequent dewaxing catalysts, the entire effluent from the hydrotreating stage may be sent to the first dewaxing stage without stripping. Hydrogen may be added to the feed stream prior to entering any reactor.

In another preferred embodiment, the hydrotreating catalyst is in a first reactor, and the first and second stage dewaxing catalysts are in separate second or second and third reactors. The effluent from the hydrotreating reactor is conducted, with or without stripping, to a second reactor containing the first dewaxing catalyst. The effluent from first dewaxing stage is then conducted to the second dewaxing stage, preferably without interstage stripping.

In either embodiment, the effluent from the second dewaxing stage may be conducted to a separator wherein a gaseous phase is separated from a liquid phase. The liquid effluent phase is sent to a fractionator to produce the desired lube oils having improved properties.

In some instances, it may be preferred that the liquid effluent from the second dewaxing stage be hydrofinished prior to being sent to the fractionator. If hydrofinishing is desired, the product resulting from dewaxing may be hydrofinished in order to adjust product qualities to desired specifications. Hydrofinishing is a form of mild hydrotreating directed to saturating any lube range olefins and residual aromatics as well as to removing at least a portion of any remaining heteroatoms and color bodies. The post dewaxing hydrofinishing is usually carried out in cascade with the dewaxing step. Generally hydrofinishing will be carried out at temperatures from about 150° C. to 350° C., preferably 180° C. to 250° C. Total pressures are typically from 2859 to 20786 kPa (about 400 to 3000 psig). Liquid hourly space velocity is typically from 0.1 to 5 hr.$^{-1}$, preferably 0.5 to 3 hr.$^{-1}$ and hydrogen treat gas rates of from 44.5 to 1780 m$^3$/m$^3$ (250 to 10,000 scf/B).

Hydrofinishing catalysts are those containing Group VI metals, Group VIII metals, and mixtures thereof. Preferred metals include at least one noble metal having a strong hydrogenation function, especially platinum, palladium and mixtures thereof. The mixture of metals may also be present as bulk (not supported) metal catalysts wherein the amount of metal is 30 wt. % or greater based on catalyst. It is preferred that the hydrofinishing catalyst be a supported catalyst. Suitable metal oxide supports include low acidic oxides such as silica, alumina, silica-aluminas or titania, preferably alumina. The preferred hydrofinishing catalysts for aromatics saturation will comprise at least one metal having relatively strong hydrogenation function on a porous support. Typical support materials include amorphous or crystalline oxide materials such as alumina, silica, and silica-alumina. The metal content of the catalyst can be as high as about 20 weight percent for non-noble metals. Noble metals are usually present in amounts no greater than about 1 wt. %. A preferred hydrofinishing catalyst is a mesoporous material belonging to the M41S class or family of catalysts. The M41S family of catalysts are mesoporous materials having high silica contents whose preparation is further described in J. Amer. Chem. Soc., 1992, 114, 10834. Examples included MCM-41, MCM-48 and MCM-50. Mesoporous refers to catalysts having pore sizes from 15 to 100 Angstroms. A preferred member of this class is MCM-41 whose preparation is described in U.S. Pat. No. 5,098,684. MCM-41 is an inorganic, porous, non-layered phase having a hexagonal arrangement of uniformly-sized pores. The physical structure of MCM-41 is like a bundle of straws wherein the opening of the straws (the cell diameter of the pores) ranges from 15 to 100 Angstroms. MCM-48 has a cubic symmetry and is described for example is U.S. Pat. No. 5,198,203 whereas MCM-50 has a lamellar structure. MCM-41 can be made with different size pore openings in the mesoporous range. The mesoporous materials may bear a metal hydrogenation component, which is at least one Group VIII metal. Preferred are Group VIII noble metals, most preferably Pt, Pd or mixtures thereof.

The following examples will illustrate the improved effectiveness of the present invention, but are not meant to limit the present invention in any fashion.

EXAMPLES

Example 1

This example illustrates processing clean feeds with a hydrodewaxing catalyst with a refined constraint index (CI*) of 1.73. The feed was a 150 N slack wax hydrotreated at 255° C. The properties of the hydrotreated 150 N slack wax are given in Table 1 below. Pour Points were determined by standard ASTM test D5950-1. Sulfur and nitrogen contents were measured by standard ASTM methods D4927 and D4629, respectively.

TABLE 1

| | |
|---|---|
| Mean Average Boiling Point (° C.) | 421.9° C. |
| Nitrogen, wppm | 1 |
| Sulfur, wppm | 80 |
| Oil in wax, wt. % | 8 |

The feed from Table 1 was hydrotreated using Akzo Nobel KF848 catalyst under the following hydrotreating conditions: 255° C., 0.7 v/v/h, 1000 psig, and 1526 scf/b (272 m³/m³) $H_2$. The hydrotreated product's 370° C.+ yield was 93 wt %. The hydrotreated product properties are given in Table 2.

TABLE 2

| | |
|---|---|
| Mean Average Boiling Point (° C.) | 416.4° C. |
| Sulfur, wppm | 2 |

The hydrotreated product was hydrodewaxed using a ZSM-48 based catalyst (65 wt. % ZSM-48 and 35 wt. % alumina) at the following conditions: 331° C., 1 v/v/h, 1000 psig, and 3464 scf/b (617 m³/m³) of $H_2$. The ZSM-48 based catalyst was bound with alumina and loaded with 0.6 wt % Pt as metal and then was ex-situ sulfided with 400 ppm $H_2S$ in nitrogen to $H_2S$ breakthrough. The catalyst had a refined constraint index of 1.73. The hydrodewaxed results are given in Table 3 below.

TABLE 3

| | |
|---|---|
| Mean Average Boiling point | 353.6° C. |
| 370° C.+ Yield, wt % on feed to Hydrodewaxer | 62 |
| 370° C.+ Isomerate Product Properties | |
| Viscosity at 100° C. (cSt) | 3.36 |
| VI | 135 |
| Pour Point (° C.) | −26° C. |
| Cloud Point (° C.) | −17.1° C. |

Example 2

This example illustrates processing hydrotreated feeds with the stacked bed of ZSM-48 based catalyst as defined in Example 1 above followed by ZSM-23 based catalyst (65 wt. % ZSM-23 and 35 wt. % alumina) with refined constraint indexes of 1.73 and 3.95, respectively. The feed was identical to the 150 N slack wax feed used in example 1 above. Further, the feed was hydrotreated at identical conditions with the same Akzo Nobel KF848 catalyst as described in example 1 above.

The hydrotreated product was hydrodewaxed with a 2:1 stacked bed of ZSM-48/ZSM-23 based catalysts (both as defined above) at the following conditions: 332° C., 0.8 v/v/h, 1000 psig, and 3377 scf/b (601 m³/m³) of $H_2$. The ZSM-48 based catalyst's refined constraint index was 1.73. The ZSM-23 based catalyst was bound with alumina and loaded with 0.6 wt % Pt. The ZSM-23 based catalyst's refined constraint index was 3.95. The hydrodewaxed results are given in Table 4 below.

TABLE 4

| | |
|---|---|
| Mean Average Boiling point | 369° C. |
| 370° C.+ Yield, wt % on feed to Hydrodewaxer | 63 |
| 370° C.+ Isomerate Product Properties | |
| Viscosity at 100° C. (cSt) | 3.38 |
| VI | 135 |
| Pour Point (° C.) | −29° C. |
| Cloud Point (° C.) | −20.6° C. |

At roughly constant VI and yield, the stacked bed configuration has a 3° C. and 3.5° C. lower pour point and cloud point, respectively, as illustrated in Tables 3 and 4. NMR analysis supports this finding by showing an 11% increase in terminal methyl side chains in the oil basestock produced from the stacked bed configuration as compared to ZSM-48 alone, as shown in Table 5 below. However, in spite of the increase in terminal methyls, pour point, and cloud point, the overall average number of side chains is lower in the feedstock produced according to the invention. This shows the increased selectivity of the second stage catalyst according to the invention for improving the pour properties of a lubricant while avoiding introduction of undesirable additional side chains that would lead to a lower viscosity index.

TABLE 5

| | Terminal Methyls [mole %] | Epsilon (ε) [mole %] | Average carbon number [CN(B*)] | Average number of side chains [NS(B*)] |
|---|---|---|---|---|
| 370° C.+ Isomerate produced from ZSM-48 Alone | .83 | 14.50 | 30.9 | 2.9 |
| 370° C.+ Isomerate produced from 2:1 ZSM-48/ ZSM-23 stacked bed | .93 | 15.65 | 29.6 | 2.8 |

What is claimed is:

1. A two stage process for dewaxing a waxy lube feedstock which comprises:
   (a) contacting a feedstock in a first dewaxing stage with at least one 1D, 10-ring molecular sieve containing catalyst having a refined constraint index of 2.0 or less under first hydroisomerizing dewaxing conditions to produce a first dewaxed product stream; and
   (b) contacting said first dewaxed product stream in a second dewaxing stage with at least one 1D, 10-ring molecular sieve containing catalyst having a refined constraint index of greater than 2.0 under second hydroisomerizing dewaxing conditions to produce a dewaxed product.

2. The process of claim 1, further comprising:
   contacting a feedstock with a hydrotreating catalyst capable of converting a substantial amount of sulfur in the feedstock to $H_2S$ and nitrogen to $NH_3$, under hydrotreating conditions, thereby resulting in a hydrotreated feedstock containing less sulfur than the waxy tube feedstock, based on the total weight of the feedstock; and
   separating the hydrotreated feedstock from hydrogen sulfide, ammonia and any light hydrocarbons,
   wherein said separated hydrotreated feedstock is contacted with the molecular sieve catalyst in said first dewaxing stage.

3. The process of claim 2, herein the waxy lube feedstock contains from about 500 wppm to about 3.0 wt % sulfur.

4. The process of claim 2, wherein the hydrotreating catalyst is comprised (Original): of at least one Group 6 metal and at least one Group 8 metal of the IUPAC Periodic Table on a metal oxide support.

5. The process of claim 1, wherein the first hydroisomerizing dewaxing conditions comprise a temperature of 250° C. to 400° C., pressures of from 791 to 20786 kPa (100 to 3000 psig), liquid hourly space velocities of from 0.1 to 10 $hr^{-1}$, and hydrogen treat gas rates from 45 to 1780 $m^3/m^3$ (250 to 10000 scf/B).

6. The process of claim 1, wherein the second hydroisomerizing dewaxing conditions comprise a temperature of 250° C. to 400° C., pressures of from 791 to 20786 kPa (100 to 3000 psig), liquid hourly space velocities of from 0.1 to 10 $hr^{-1}$, and hydrogen treat gas rates from 45 to 1780 $m^3/m^3$ (250 to 10000 scf/B).

7. The process of claim 1, wherein the feedstock is selected from the group consisting of slack waxes, hydrocracker bottoms and Fischer-Tropsch waxes.

8. The process of claim 1, wherein the molecular sieve of the first dewaxing stage catalyst is selected from the group consisting of ZSM-48, EU-11 and ZBM-30.

9. The process of claim 8 wherein the first dewaxing stage catalyst contains 0.1 to 5 wt % of a hydrogenation metal.

10. The process of claim 9 wherein the hydrogenation metal is selected from the group consisting of Pt and Pd.

11. The process of claim 1, wherein the molecular sieve of second dewaxing stage catalyst is selected from the group consisting of ZSM-48, ZSM-22, ZSM-23, ZSM-35 and SAPO-11.

12. The process of claim 11 wherein the second dewaxing stage catalyst contains 0 1 to 5 wt % of a hydrogenation metal.

13. The process of claim 12 wherein the hydrogenation metal is selected from the group consisting of Pt and Pd.

14. The process of claim 1, wherein the molecular sieve of the first dewaxing stage catalyst is comprised of ZSM-48, the molecular sieve of the second dewaxing stage is comprised of ZSM-23, and said first and second stage catalysts having an effective amount of a hydrogenation metal selected from the group consisting of Pt and. Pd.

15. The process of claim 1, wherein the dewaxed product from the second dewaxing stage is treated with a hydrofinishing catalyst under hydrofinishing conditions.

16. The process of claim 15 wherein said hydrofinishing catalyst is comprised of at least one metal selected from Group VI or Group VIII on a metal oxide support.

17. The process of claim 1 wherein at least one of the metals of the hydrofinishing catalyst is selected from Pt and Pd.

18. The process of claim 15, wherein the hydrofinishing catalyst selected from the group consisting of MCM-41, MCM-48, and MCM-50.

19. The process of claim 1 wherein the refined constraint index for said second dewaxing stage catalyst is at least 2.5.

20. The process of claim 19 wherein the refined constraint index for said second dewaxing stage catalyst is at least 3.0.

* * * * *